United States Patent
Lim et al.

(10) Patent No.: US 11,644,946 B2
(45) Date of Patent: May 9, 2023

(54) METHOD AND USER TERMINAL FOR DISPLAYING ICON REPRESENTING SET OF CONTENT ON A CHAT ROOM SCREEN

(71) Applicant: KAKAO CORP., Jeju-si (KR)

(72) Inventors: Hee Jin Lim, Seongnam-si (KR); Su Hyeok Cha, Seongnam-si (KR); Hee Young Lee, Seongnam-si (KR); Yang Kyun Park, Seongnam-si (KR); Bo Kyung Kim, Seongnam-si (KR); Tae Heon Lee, Seongnam-si (KR); Jee Min Yang, Seongnam-si (KR); Ji Sun Park, Seongnam-si (KR); Ji Hyun Son, Seongnam-si (KR); Won Jae Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/575,067

(22) Filed: Jan. 13, 2022

(65) Prior Publication Data
US 2022/0236856 A1   Jul. 28, 2022

(30) Foreign Application Priority Data
Jan. 28, 2021 (KR) .................. 10-2021-0012223

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0483* (2013.01);
(Continued)

(58) Field of Classification Search
CPC .............. G06F 3/04886; G06F 3/0482; G06F 3/04817; G06F 3/04842; G06F 3/0236;
(Continued)

(56) References Cited

U.S. PATENT DOCUMENTS 8,584,031 B2 * 11/2013 Moore ................ G06F 3/04883
715/835
10,482,163 B2 * 11/2019 Hullette ................ G06Q 50/01
(Continued)

FOREIGN PATENT DOCUMENTS

JP    2017514194 A    6/2017
JP    2018536249 A    12/2018
(Continued)

*Primary Examiner* — Nicholas Ulrich
(74) *Attorney, Agent, or Firm* — Novick, Kim & Lee PLLC; Jae Youn Kim (57) ABSTRACT

A method and a user terminal for providing contents to a user, and a method and a server for providing contents to a user terminal. The method for providing contents to a user includes: displaying, by a user terminal, a first list including a first content belonging to a first set and a second content belonging to a second set different from the first set in a first region on a chat room screen; when a user's interaction with the first content is received, displaying, by the user terminal, a first interface for requesting contents in the first set; and when a user's interaction with the first interface is received, displaying, by the user terminal, an icon indicative of the first set on the screen and a second list including at least one content belonging to the first set in the first region.

18 Claims, 8 Drawing Sheets

(51) Int. Cl.
*G06F 3/0483* (2013.01)
*H04L 51/04* (2022.01)
*G06F 3/04886* (2022.01)
*H04M 1/72439* (2021.01)
*H04M 1/72436* (2021.01)

(52) U.S. Cl.
CPC .......... *G06F 3/04886* (2013.01); *H04L 51/04* (2013.01); *H04M 1/72436* (2021.01); *H04M 1/72439* (2021.01); *G06F 2203/04803* (2013.01)

(58) Field of Classification Search
CPC ......... G06F 2203/04803; G06F 3/0219; G06F 3/0483; H04M 1/72436; H04M 1/72439; H04L 51/04; H04L 51/10; H04L 51/08
See application file for complete search history.

(56) References Cited

U.S. PATENT DOCUMENTS

| | | | |
|---|---|---|---|
| 10,554,600 B2* | 2/2020 | Yuan | H04L 67/42 |
| 10,659,405 B1* | 5/2020 | Chang | G06F 3/0482 |
| 2016/0259526 A1* | 9/2016 | Lee | G06F 3/048 |
| 2018/0255009 A1* | 9/2018 | Chen | H04L 51/32 |

FOREIGN PATENT DOCUMENTS

| | | | |
|---|---|---|---|
| JP | 2019102001 A | 6/2019 | |
| KR | 20160112260 A | 9/2016 | |
| KR | 20180077267 A | 7/2018 | |
| KR | 20190134082 A | 12/2019 | |

* cited by examiner

METHOD AND USER TERMINAL FOR DISPLAYING ICON REPRESENTING SET OF CONTENT ON A CHAT ROOM SCREEN

CROSS REFERENCE TO RELATED APPLICATION

The present application claims priority to Korean Patent Application No. 10-2021-0012223 filed Jan. 28, 2021, the entire contents of which is incorporated herein for all purposes by this reference.

Applicant notes that the publication made on Jan. 13, 2021, at the website on the world wide web yna.co.kr/view/AKR20210112144800017?input=1195m, was a grace period inventor disclosure exception under 35 USC 102(b)(1)(A), and thus does not qualify as prior art.

FIELD OF THE DISCLOSURE

The present disclosure relates to a method and a user terminal for providing contents to a user, and a method and a server for providing contents to a user terminal.

RELATED ART

In general, an emoticon, which is a pictogram, is a compound word of two words, emotion and icon. This emoticon is a unique expression on the Internet created to express various types of emotion, specific characters, jobs, and the like by appropriately combining letters, symbols, and numbers in a computer keyboard.

In recent years, with the development of technology, messages (i.e., Multimedia Message Service (MMS)) including high-resolution images can be easily used on mobile devices and diverse message applications executable in a mobile device has been used. In addition, animated emoticons which is provide in a manner of outputting an image of a specific character or showing a dynamic motion of the character for a predetermined time have been developed and used in addition to the existing emoticons that utilizes special characters.

However, in the conventional method of using emoticons, if a user wishes to use a desired emoticon that the user does not have, it is necessary to download the emoticon.

In this case, in order to use a desired emoticon that the user does not have in a chat room, it is required to access a store selling emoticons, select a desired emoticon set, download the selected emoticon set, and select a desired emoticon from a list corresponding to the downloaded emoticon set.

As such, the conventional method of using emoticons requires the user to go through a long procedure from accessing a store, downloading, selecting an emoticon, and the like, which is inconvenient and cumbersome.

SUMMARY OF THE DISCLOSURE

The present disclosure provides a method a user terminal for providing contents to a user, and a method and a server for providing contents to a user terminal.

In an aspect, there is provided a method of providing contents to a user, and the method includes: displaying, by a user terminal, a first list including a first content belonging to a first set and a second content belonging to a second set different from the first set in a first region on a chat room screen; when a user's interaction with the first content is received, displaying, by the user terminal, a first interface for requesting contents in the first set; and when a user's interaction with the first interface is received, displaying, by the user terminal, an icon indicative of the first set on the screen and a second list including at least one content belonging to the first set in the first region.

In the displaying of the first interface, the user terminal may display a preview content of the first content in a preview region of the screen and displays the first interface in the preview region.

The icon indicative of the first set may be displayed while the user terminal maintains the state of being entered into the chat room.

When the user terminal re-enter the chat room after the state of being entered into the chat room is released, the icon indicative of the first set may not be displayed.

The first interface may have an image of a character identical to a character of the icon indicative of the first set.

The icon indicative of the first set may be displayed in a second region different from the first region on the screen. The second region may include a function tab region and a fixed tab region. A function icon for providing at least one function of content search, search suggestion, and favorites may be displayed in the function tab region. A fixed icon for providing a content set of designated by the user may be displayed in the fixed tab region, and the fixed icon may be maintained even when the user re-enters the chat room after disconnecting the chat room. In the displaying of the icon indicative of the first set, the icon indicative of the first set may be positioned between the function tab region and the fixed tab region.

The icon indicative of the first set may include an image distinct from the fixed icon.

In the displaying of the icon indicative of the first set, when the icon indicative of the first set is displayed, the fixed icon may move in a direction opposite to the first set of icons and then the icon indicative of the first set may be displayed between the function icon and the fixed icon.

In the displaying of the second list, the user terminal may display a second interface associated with a request to download the second list. When the user terminal receives a user's interaction with the second interface, the icon indicative of the first set may be displayed as a fixed icon, and the fixed icon may be maintained even when the user re-enters the chat room after disconnecting the chat room.

In another aspect, there is provided a computer program stored on a medium to implement the aforementioned method for providing contents to a user, in combination with hardware.

In yet another aspect, there is provided a user terminal for providing contents to a user, and the user terminal includes a memory; a processor connected to the memory and configured to execute instructions stored in the memory; an input unit configured to receive information under control of the processor; and an output unit configured to output information under control of the processor. The processor may be further configured to: control the output unit to display a first list including a first content belonging to a first set and a second content belonging to a second set different from the first set in a first region on a chat room screen; when a user's interaction with the first content is received through the input unit, control the output unit to display a first interface for requesting contents in the first set on the output unit; and when the user's interaction with the first interface is received through the input unit, control the output unit to display an icon indicative of the first set on the chat room screen and display a second list including at least one content belonging to the first set in the first region.

In yet another aspect, there is provided a method for providing contents to a user terminal, and the method includes: providing, by a server, information on a first list including first content belonging to a first set and a second content belonging to a second set different from the first set to the user terminal; receiving, by the server, a user's selection information on selection of the first content from the user terminal; and providing, by the server, information on a second list including at least one content belonging to the first set to the user terminal.

In the providing of the information on the first list, the server may provide at least one of thumbnail information, preview information, and icon information on each of the first content and the second content included in the first list to the user terminal.

In the providing of the information on the second list, the server may provide at least one of thumbnail information and preview information on each of at least one content belonging to the first set to the user terminal.

In yet another aspect, there is provided a server for providing contents to a user terminal, and the server includes a memory and a processor connected to the memory and configured to execute instructions stored in the memory. The processor may be further configured to: provide information on a first list including a first content belonging to a first set and a second content belonging to a second set different from the first set to the user terminal; receive a user's selection information on selection of the first content from the user terminal; and provide information on a second list including at least one content belonging to the first set to the user terminal.

In the present disclosure, when the first list including the first content of the first set and the second content of the second set associated with a character different from a character of the first set, the icon indicative of the first set to which a content desired by the user from among the first list belongs may be displayed in the second region and the content belonging to the first set may be displayed in the user terminal, thereby enabling the user to conveniently use the desired content without downloading.

DESCRIPTION OF EXEMPLARY
EMBODIMENTS

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof will be omitted. In addition, the terms used henceforth are used to appropriately express the embodiments of the present disclosure and may be altered according to a person of a related field or conventional practice. Therefore, the terms should be defined on the basis of the entire content of this specification.

The terminologies used herein are used just to illustrate a specific exemplary embodiment, but are not intended to limit the present disclosure. The singular forms used herein include plural forms unless the context clearly dictates the contrary.

It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

Hereinafter, the present disclosure will be described with reference to the accompanying drawings.

Figure 1:
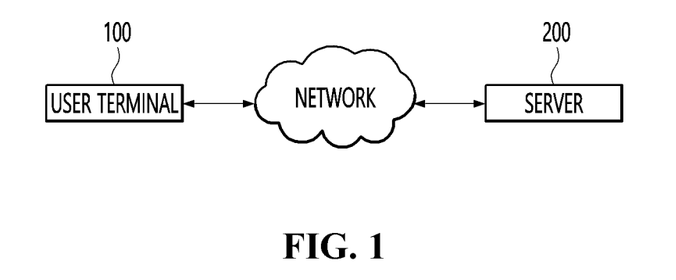
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a user terminal 100 and a server 200.

A communication method for the network is not limited and may include not only a communication method using a communication network (e.g., a mobile communication network, a wired Internet, a wireless Internet, a broadcasting network) that the network can include, but also a short-range wireless communication method.

The user terminal 100 may be a fixed terminal implemented as a computer device or a mobile terminal. For example, the user terminal 100 may include a smart phone, a mobile phone, a tablet PC, a computer, a notebook computer, personal digital assistants (PDA), and the like. For example, the user terminal 100 may communicate with the server 200 via a network using a wireless or wired communication method.

Such a user terminal 100 may be used by a user. The user may be a user of the user terminal 100 or an account registered as a user in an instant message service provided by the server 200. Therefore, if the server 200 transmits certain information to the user, it may mean that the information is transmitted to the user terminal 100 through the user's account registered in the server 200.

The user terminal 100 may receive the user's interaction. An interaction refers to the user's operating an input means to input information reflecting the user's selection or intention into the user terminal 100. Here, the input means may be provided in the user terminal 100 or connected to the user terminal 100. For example, the input means may be a touch screen module, a keyboard, a mouse, a button, a camera, a microphone, and the like.

The user terminal 100 may provide a first list including a plurality of contents on a screen. Specifically, the user terminal 100 may display a first list in a first region of a chat room screen.

For example, a content may be a character emoticon, a sticker, an image, and the like. The user terminal 100 receives an interaction of selecting any one content from the first list from the user.

Based on the received interaction, the user terminal 100 may display an icon indicative of a set to which the selected content belongs in a second region, and may display a second list including contents belonging to the corresponding set.

The above-described first and second regions will be described in detail below with reference to FIG. 4.

Here, a set refers to a set of one or more contents. One set may include a plurality of contents having characteristics in common. For example, one set may include a plurality of contents related to the same character, may include a plurality of contents related to characters that are associated with each other, or a plurality of contents sharing a single visual concept.

In addition, a list refers to a set of one or more contents simultaneously displayed on the user terminal 100. A list may include a content belonging to one set or a content belonging to two or more different sets. For example, the first list includes a content belonging to two or more different sets, and the second list includes a content belonging to one set.

The operation of the user terminal 100 will be described in more detail with reference to FIG. 3.

The server 200 may be implemented as a computer device or a plurality of computer devices communicating with the user terminal 100 via a network to provide commands, codes, files, contents, services, and the like.

The server 200 may provide contents to the user terminal 100. Specifically, the server 200 may provide information on the first list including a plurality of contents to the user terminal 100 through a chat room.

Here, information on a list may include at least one of thumbnail information, preview information, and icon information on each content included in the corresponding list. The user terminal 100 may display a content in the first region using thumbnail information, display a content in a preview region using the preview information, and display a content in the second region using the icon information.

When the user's selection information is received from the user terminal 100, the server 200 may provide information on the second list including a content according the selection information to the user terminal. The operation of the server 200 will be described in more detail with reference to FIG. 10.

The server 200 may provide an instant message service to the user terminal 100. The instant message service may refer to a real-time online service in which a plurality of users can instantly send and receive messages through a chat room, without using an e-mail program or a web browser via a network.

In FIG. 1, an example in which the server 200 provides a content along with an instant message to the user terminal 100 has been described. However, the present disclosure is not limited thereto, and an instant message may be provided to the user terminal 100 through a separate server and the server 200 of the present disclosure may provide only contents to the user terminal 100.

Hereinafter, an example in which the server 200 of the present disclosure provides a content along with an instant message will be described.

Figure 2:
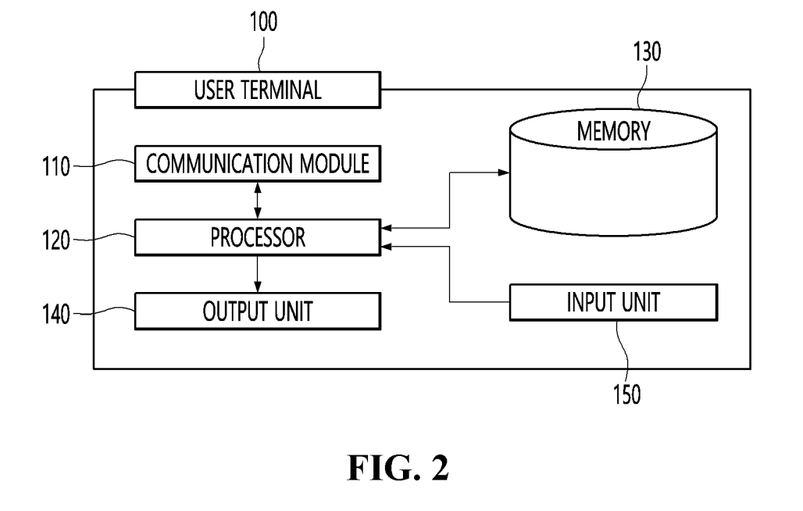
FIG. 2 is a diagram for explaining a configuration of a user terminal according to an embodiment of the present disclosure.

FIG. 2 is a diagram for explaining a configuration of the user terminal 100 according to an embodiment of the present disclosure.

Referring to FIG. 2, the user terminal 100 according to the embodiment may include a communication module 110, a processor 120, a memory 130, an output unit 140, and an input unit 150.

The communication module 110 may communicate with the server 200 in a wired/wireless manner. For example, the communication module 110 may transmit or receive various types of information, data, or signals related to provision of an instant message service and a content.

The input unit 150 may receive, from a user, various types of information necessary to provide an instant message service and a content. The input unit 150 may be a touch screen module, a keyboard, a mouse, a button, a camera, a microphone, and the like.

The output unit 140 may output information necessary to provide an instant message service and a content. A chat room screen related to content provision, first and second lists including contents, and an icon indicative of a set to which a content belongs may be displayed through the output unit 140.

The output unit 140 and the input unit 150 may have an inter-layered structure or may be formed integrally with each other to implement a touch screen. The touch screen may provide an input interface and an output interface between the user terminal 100 and the user.

The memory 130 may serve as a storage medium. The memory 130 may store a plurality of application programs or applications to be driven in the user terminal 100, and data and instructions for operation of the user terminal 100.

In one embodiment, information necessary to execute the provision of an instant message service and a content may be stored in the form of a computer program in the memory 130.

The memory 130 may be provided as any of various hardware storage devices, such as a Read-Only Memory (ROM), a Random Access Memory (RAM), an Electrically Erasable Programmable Read-Only Memory (EEPROM), a flash drive, and a hard drive, or may be provided in the form of a web storage configured to perform a storing function of the memory 130 on the Internet.

The processor 120 may control the overall operation to execute an application related to provision of an instant message service and content.

Figure 3:
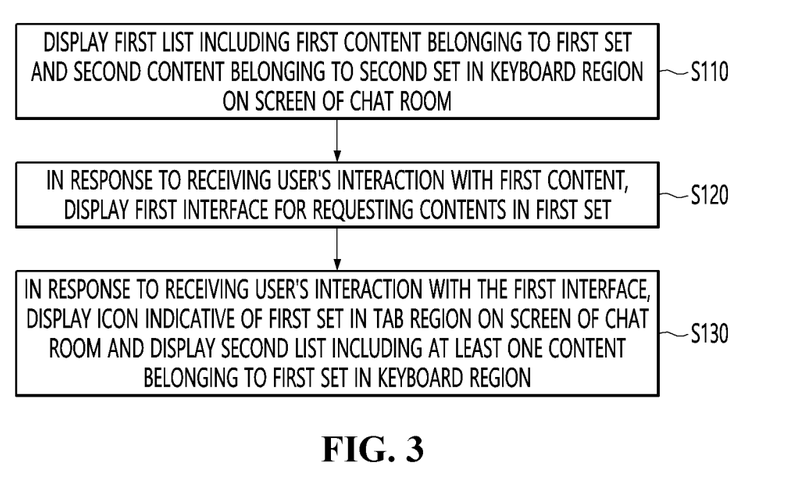
FIG. 3 is a diagram for explaining an example of a method for a user terminal to provide contents to a user according to an example of the present disclosure.

For example, the processor 120 may execute an application related to provision of contents to perform an operation method of the user terminal 100 shown in FIG. 3.

Hereinafter, a method for the user terminal to provide contents 100 will be described with reference to FIGS. 3 to 8.

FIG. 3 is a diagram for explaining an example of a method for a user terminal to provide contents to a user according to an example of the present disclosure, and FIGS. 4 to 8 are diagrams for explaining the respective operations shown in FIG. 3 in more detail.

Referring to FIG. 3, the method for the user terminal to provide contents may include displaying a first list in operation S110, displaying a first interface in operation S120, and displaying a second list in operation S130.

The above-described operations S110, S120, and S130 may be performed in the order shown in the drawing. However, in some cases, the order in which the respective operations are performed may be changed unless there is a specific temporal order among the operations.

Hereinafter, the operation S110 of displaying the first list will be described with reference to FIG. 4 together with FIG. 3. The operation S120 of displaying the first interface will be described with reference to FIG. 5 together with FIG. 3. The operation S130 of displaying the second list will be described with reference to FIGS. 6 to 8 together with FIG. 3.

Prior to describing the method for the user terminal to provide contents, an exemplary configuration of a chat room screen will be described with reference to FIG. 4.

Figure 4:
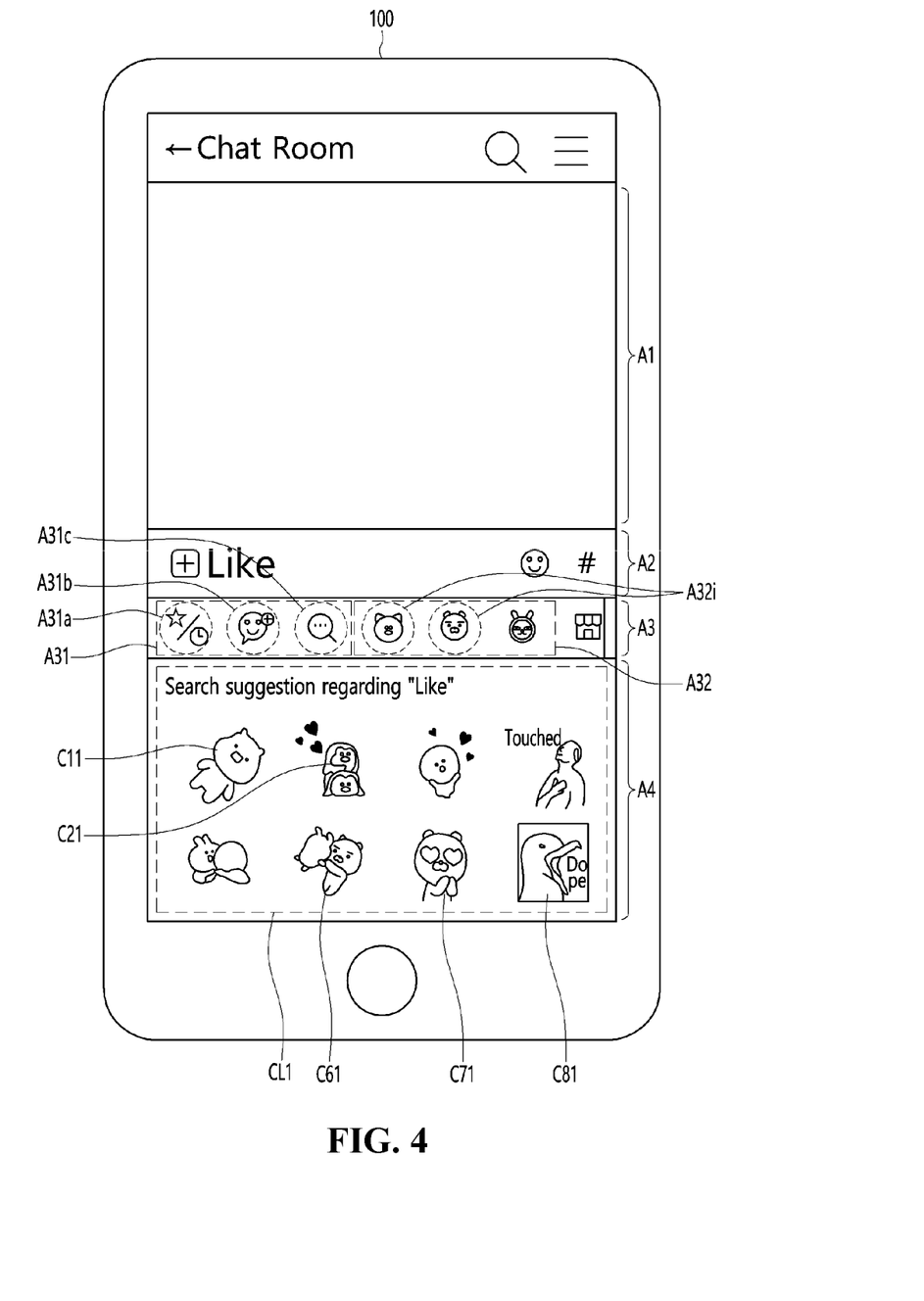
FIGS. 4 to 8 are diagrams for explaining each operation shown in FIG. 3 in more detail.

As shown in FIG. 4, a chat room screen displayed on the user terminal 100 may include a chat window region A1, an input bar region A2, a second region A3, and a first region A4.

A message or content exchanged between the user of the user terminal 100 and the other person in the chat room may be displayed in the chat window region A1, and a message to be sent may be input by the user in the input bar region A2.

The second region A3 may include a function tab region A31 and a fixed tab region A32. Function icons A31a, A31b, and A31c for providing at least one of content search, search suggestion, and favorites may be displayed in the function tab region A31. A fixed icon A32i for providing a content set designated by the user may be displayed in the fixed tab region A32. Here, the content set designated by the user may be a content set purchased by the user or may be content-related information downloaded in the user terminal 100 by the user.

In FIG. 4, there is illustrated an example in which a favorites icon A31a, a search suggestion icon A31c, and a search icon A31b are all displayed in the function tab region A31.

Here, when the favorites icon A31a is selected by the user, a list of contents recently used in the user terminal 100 or designated as favorites by the user may be displayed in the first region A4.

When the search icon A31b is selected by the user, a search list of contents may be displayed in the first region A4 based on text information that is input by the user into the input bar region A2.

When the search suggestion icon A31c is selected by the user, a list of specific keywords selected by an operator may be displayed in the first region A4.

The first region A4 may be positioned at a lower part of the chat room screen. Specifically, the first region A4 may be continuously positioned at the lower part of the second region A3.

The first region A4 may be displayed, for example, in a form that covers an area where a keyboard for inputting a text is displayed in the input bar region A2. Specifically, the first region A4 may be displayed to cover a part or all of the area where the keyboard is displayed. FIG. 4 illustrates a case where the first region A4 is displayed in a form that covers the entire area where the keyboard is displayed. In FIG. 4, it may appear that the first region A4 replaces the area where the keyboard is displayed. However, in some cases, the first region A4 may be separately displayed in an area other than the area where the keyboard is displayed.

In the first region A4, at least one content may be displayed in the form of a list or the like when the user terminal 100 wishes to receive selection of a content from the user. FIG. 4 illustrates a case where contents are displayed in the form of a list in the first region A4.

When a message or content is displayed on the chat room screen, the chat window region A1 may be positioned to entirely cover the chat room screen. However, when the user terminal 100 receives selection information on selection of a content, the chat window region A1 in which a message or emoticon is displayed may be positioned in an upper part of the chat room screen, and the input bar region A2, the second region A3, and the first region A4 may be sequentially positioned under the chat window region A1, as shown in FIG. 4.

The operation S110 of displaying the first list will be described with reference to FIGS. 3 and 4.

In the operation S110 of displaying the first list of FIG. 3, the user terminal 100 may display a first list CL1 in the first region A4 on the chat room screen.

The first list CL1 may be displayed in the first region A4, for example, subsequently after the favorites icon A31a, the search suggestion icon A31c, and the search icon A31b are selected. For example, the first list CL1 may include contents according to a search result after the search suggestion icon A31c is selected.

In addition, when a content used by the other person in the chat room is selected by the user, the first list CL1 may be displayed based on the content used by the other person. The present disclosure is not limited thereto, and the first list CL1 may be displayed in various other methods (e.g., random search).

The first list CL1 of the present disclosure may include a first content C11 belonging to the first set and a second content C21 belonging to the second set. Here, the first set and the second set may correspond to different sets. The first list CL1 of the present disclosure is not limited to including only the first content C11 and the second content C21, but the first list CL1 may include a plurality of contents C11 to C81 including the first and second contents C11 and C21 and displayed as shown in FIG. 4.

The user terminal 100 may receive information on the first list CL1 from the server 200. The information on the first list CL1 received by the user terminal 100 may include at least some of thumbnails, preview contents, and set icons for contents included in the first list CL1.

In the operation S110 of displaying the first list, the user terminal 100 may display the plurality of contents included in the first list CL1 in the form of thumbnails in the first region A4.

Although FIG. 4 illustrates an example in which the number of contents included in the first list CL1 is 8, the present disclosure is not limited thereto and the number of contents included in the first list CL1 may vary.

Here, the first and second contents C11 and C21 may be emoticons, stickers, images and the like of characters that the user wishes to send to the other person in the chat room.

In addition, the first content C11 belonging to the first set and the second content C21 belonging to the second set of the present disclosure may have images of different characters.

The different characters may refer to different designs or concepts. For example, when the first content C11 included in the first set is associated with a hippo-shaped character, the second content C21 included in the second set may be associated with a penguin-shaped character. However, the present disclosure is not limited thereto, and in some cases, contents C61 and C71 associated with the same character may be included in the first list CL1, as shown in FIG. 4.

Next, the operation S120 of displaying the first interface will be described with reference to FIGS. 3 and 5.

As shown in FIG. 3, in the operation S120 of displaying the first interface, when the user terminal 100 receives the user's interaction with the first content C11, the user terminal 100 may display the first interface for requesting a plurality of contents included in the first set to which the first content belongs.

That is, when the user terminal 100 receives an interaction such as a touch or click on the first content C11 among the contents displayed on the first list CL1, the user terminal 100 may display the first interface for requesting the contents included in the first set to which the first content C11 belongs.

Figure 5:
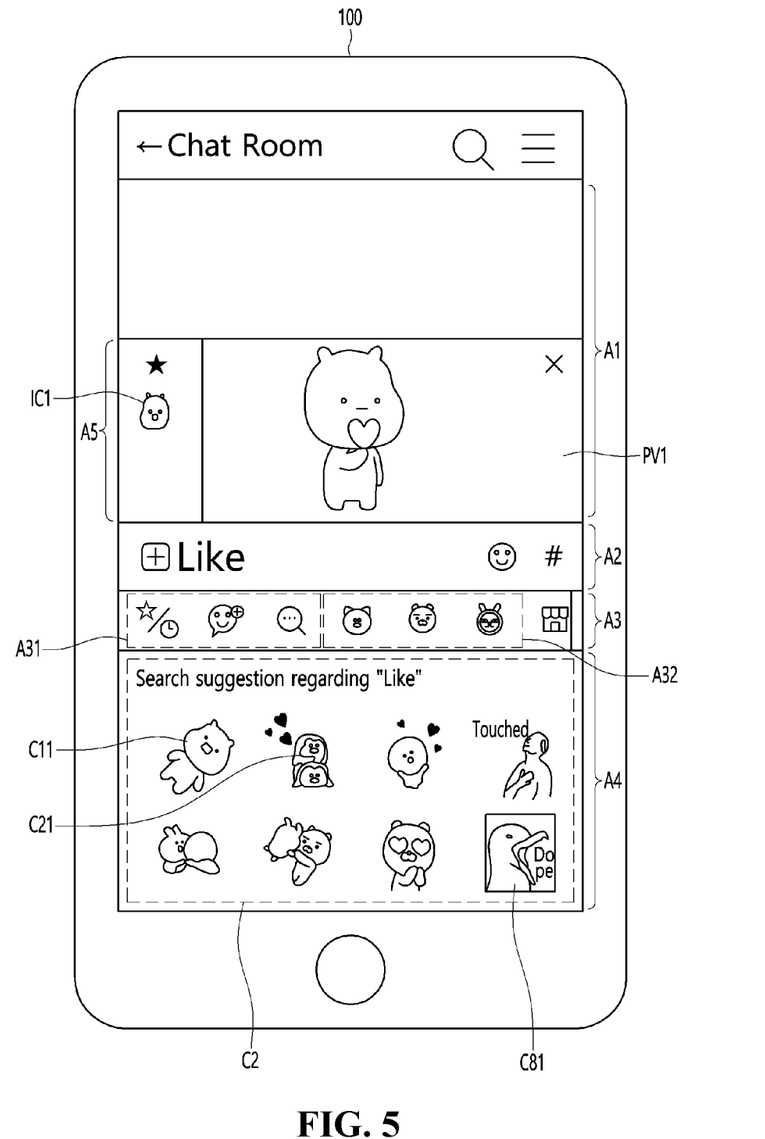

For example, as shown in FIG. 5, in the operation S120 of displaying the first interface, the user terminal 100 may receive an interaction such as a touch or click on the content C11 from the user. Accordingly, the user terminal 100 may display the first interface in the preview region A5 of the chat room screen.

The preview region A5 may be displayed overlaid on the chat window region A1 of the chat room screen. Specifically, the preview region A5 may be positioned above the first region A4 and the second region A3. However, the present disclosure is not limited thereto, and the preview region A5 may be overlaid on the chat room screen to cover the first region A4 and the second region A3.

The first interface may be to request the contents in the first set to which the first content C11 belongs. The first interface may be displayed as the icon IC1 indicative of the first set. The icon IC1 indicative of the first set may be received along with thumbnails of contents and preview contents when the user terminal 100 receives information on the first list CL1 from the server 200.

The icon IC1 indicative of the first set may be an icon predetermined to correspond to the first set. Therefore, even if the user terminal 100 receives the user's interaction with another content belonging to the first set rather than the user's interaction with the first content C11, the first interface may be displayed as the same icon IC1 indicative of the first set.

In the operation S120 of displaying the first interface, the user terminal 100 may display a preview content PV1 of the first content C11 together with the first interface in the preview region A5.

Next, the operation S130 of displaying the second list will be described with reference to FIGS. 3 and 6 to 8.

Figure 6:
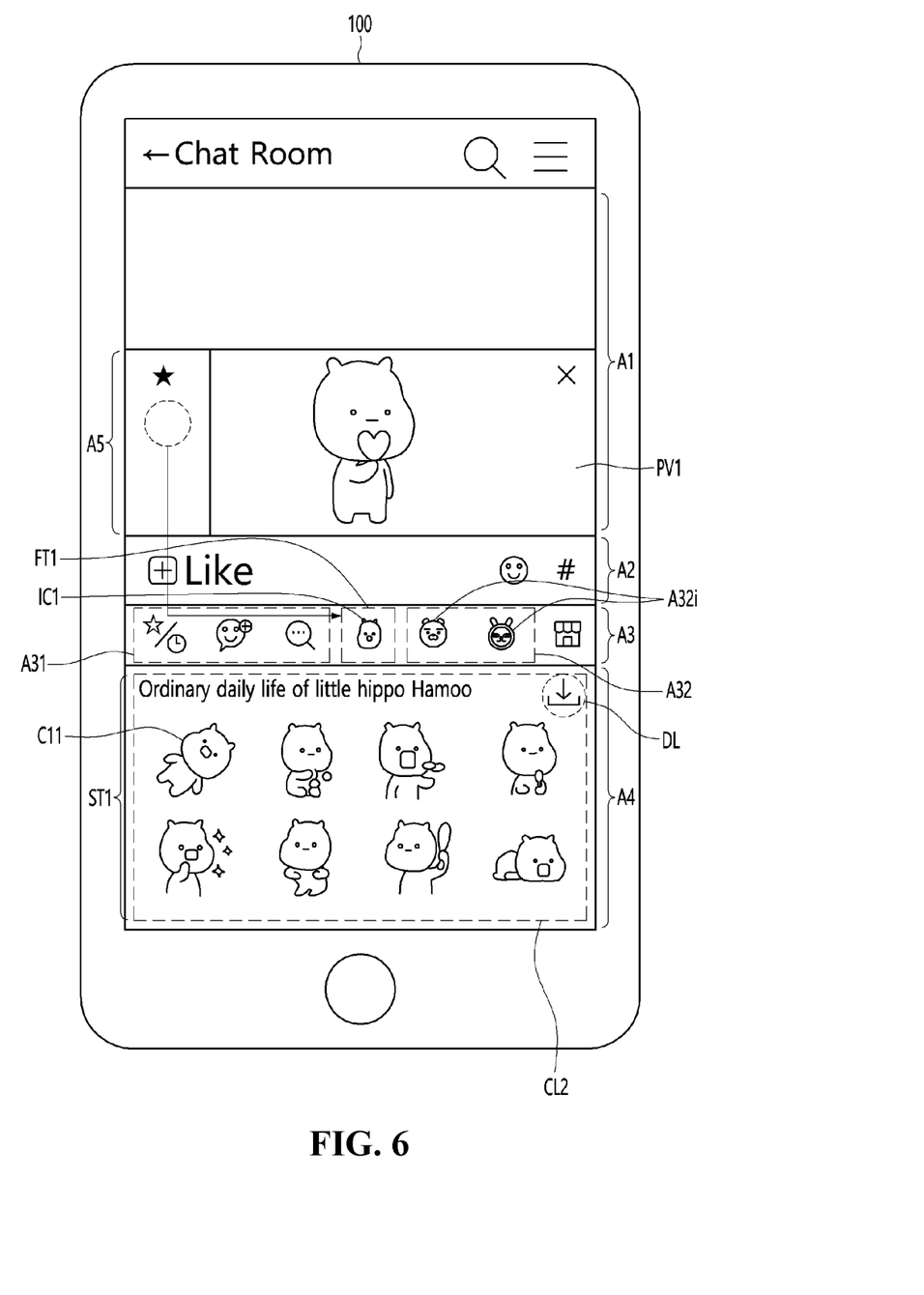

In the operation S130 of displaying the second list, when the user terminal 100 receives the user's interaction with the first interface, the icon IC1 indicative of the first set may be is displayed in the second region A3 of the chat room screen.

In addition, in the operation S130 of displaying the second list, the user terminal 100 may display, in the first region A4, a second list CL2 including at least one content C11 belonging to the first set ST1.

When the user terminal 100 receives the user's interaction such as a touch or click on the first interface, the operation S130 of displaying the second list may be performed and hence the icon IC1 indicative of the first set ST1 and the second list CL2 may be displayed simultaneously. In addition, the icon IC1 indicative of the first set, which has been displayed as the first interface, may disappear.

For example, as shown in FIG. 6, the user terminal 100 may display the icon IC1 indicative of the first set ST1 in a partial region FT1 of the second region A3 on the chat room screen. In addition, the user terminal 100 may display at least one content C11 belonging to the first set ST1 as a second list CL2 in the first region A4.

In addition, in the operation S130 of displaying the second list, the user terminal 100 may display a second interface DL related to a request for downloading the second list CL2, as shown in FIG. 6.

The partial region FT1 may be positioned between the function tab region A31 and the fixed tab region A32. In this case, the fixed icon A32i may be displayed by moving in the opposite direction to the icon IC1 indicative of the first set ST1. Referring to FIG. 6, since the icon IC1 indicative of the first set ST1 is positioned on the left side of the fixed icon A32i, the fixed icon A32i may be displayed by moving in the right direction.

For example, compared to FIG. 5, in FIG. 6, the icon IC1 indicative of the first set ST1 is displayed in the partial region FT1 between the function tab region A31 and the fixed tab region A32. In the meantime, the fixed icon A32i previously positioned in the fixed tab region A32 may be displayed by moving to the right side of the icon IC1 indicative of the first set ST1.

Here, when the icon IC1 indicative of the first set ST1 is displayed in the partial region FT1, the first interface displayed in the preview region A5 may disappear.

In this case, the icon IC1 indicative of the first set ST1 displayed in the partial region FT1 may have the same or similar image as that of the icon IC1 indicative of the first set ST1 displayed in the first interface.

In FIG. 6, there is illustrated an example in which the icon IC1 indicative of the first set ST1 displayed in the partial region FT1 is identical to the icon IC1 indicative of the first set ST1 displayed in the first interface.

As such, while the user terminal 100 maintains the state of being entered into the chat room, the icon IC1 indicative of the first set ST1 may be maintained in the partial region FT1. Whether the state of being entered into the chat room is maintained may be determined by the user terminal 100.

Here, the state of being entered into the chat room refers to a state in which a message can be input through the chat room. In general, a chat room providing application may provide a plurality of chat rooms, and the user terminal 100 may select and enter one of the plurality of chat rooms.

Here, the state of being entered into the chat room does not mean a state in which the chat room screen is output to the output unit of the user terminal 100. While the state of being entered into the chat room is maintained, there may be cases in which a chat room providing application is running in the background or the output unit is locked. In this case, although the chat room screen is not output to the output unit of the user terminal 100, it may be determined that the state of being entered into the chat room is maintained.

Here, the chat room providing application may include an instant messaging application which provides a chat function as the main function, an application for other purposes (shopping, games, etc.) which provides a chat function as an additional function, or a web browser which provides a chat function.

Therefore, while the user terminal 100 maintains the state of being entered into the chat room, the icon IC1 indicative of the first set ST1 may be maintained even if an operation not directly related to the first set ST1 or the second list CL2 is performed. Specifically, in order to select another tab in the second region A3, display a content other than the second list CL2 in the first region A4, or input a message into the input bar region A2, the icon IC1 indicative of the first set ST1 may be maintained even when the first region A4 is switched to the keyboard interface.

Figure 7:
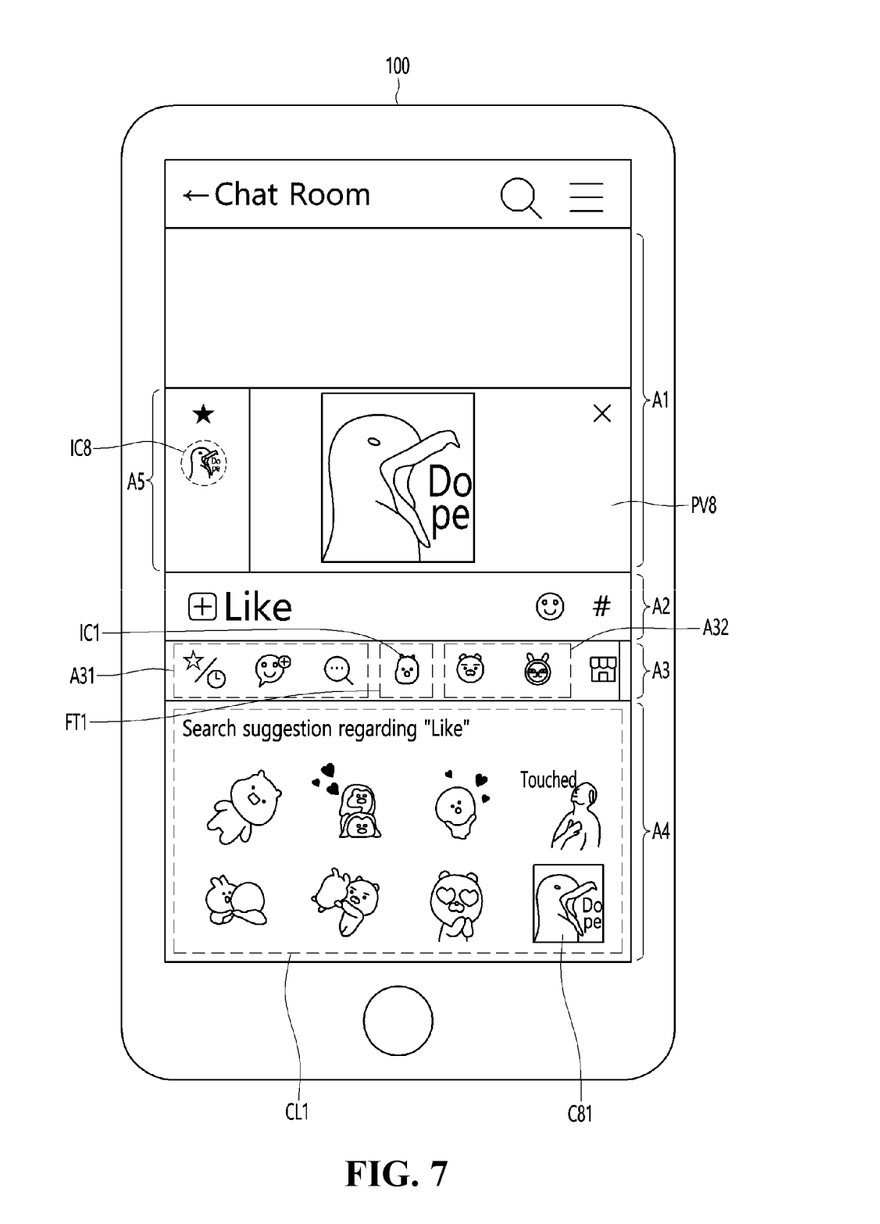

An example in which the icon IC1 indicative of the first set ST1 is maintained will be described with reference to FIG. 7. When the search suggestion icon A31c is selected by the user on the chat room screen of FIG. 6, the first list CL1 may be displayed again in the first region A4, as shown in FIG. 7. Even in this case, the icon IC1 indicative of the first set ST1 in the partial region FT1 may be maintained. In addition, although a preview content PV8 of a different content C81 is displayed in the preview region A5 as the different content C81 is selected by the user in FIG. 7, the icon IC1 indicative of the first set ST1 in the partial region FT1 may be maintained.

However, when the state in which the user terminal 100 has entered into the chat room is released, the icon IC1 indicative of the first set ST1 may be no longer displayed in the partial region FT1 even if the user terminal 100 re-enters the chat room later.

Here, the case where the state of being entered into the chat room is released may be a state of leaving the chat room and moving to a chat room list, a state of being entered into a different chat room, a state of stopping execution of the chat room providing application, a state in which the user terminal 100 is power off, or the like.

Here, the case where the state of being entered into the chat room is released may be different from a state of no longer participating in the chat room (a state of leaving the chat room). Even if the user leaves the chat room, the user remains as a participant in the chat room and is still able to send a message to the chat room.

A detailed condition for maintaining the icon IC1 indicative of the first set ST1 may be changed and set in various ways by the operator or user of the application.

For example, under a condition different from the above, the icon IC1 indicative of the first set ST1 displayed in the partial region FT1 may be maintained while the user terminal 100 executes the chat room providing application. Here, executing the application may include both a case in which a driving screen of the application is output to the output unit and a case in which the application is running in the background.

In a case where the above-described condition is set, even if the user terminal 100 leaves the chat room, the icon IC1 indicative of the first set ST1 may be displayed again in the partial region FT1 when the user terminal 100 re-enters the chat room later while the application is still running.

That is, in the operation S130 of displaying the second list, the partial region FT1 in which the icon IC1 indicative of the first set ST1 is displayed may be a variable tab that is maintained as long as a preset condition (e.g., whether the state of being entered into a chat room is maintained or whether the application is maintained running) is satisfied.

Alternatively, the fixed icon A32i may be maintained in the second region A3 even if the user terminal 100 terminates the chat room providing application and then re-executes the application.

Various embodiments of displaying the second list CL2 displayed on the first region A4 will be described with reference to FIG. 8.

Figure 8:
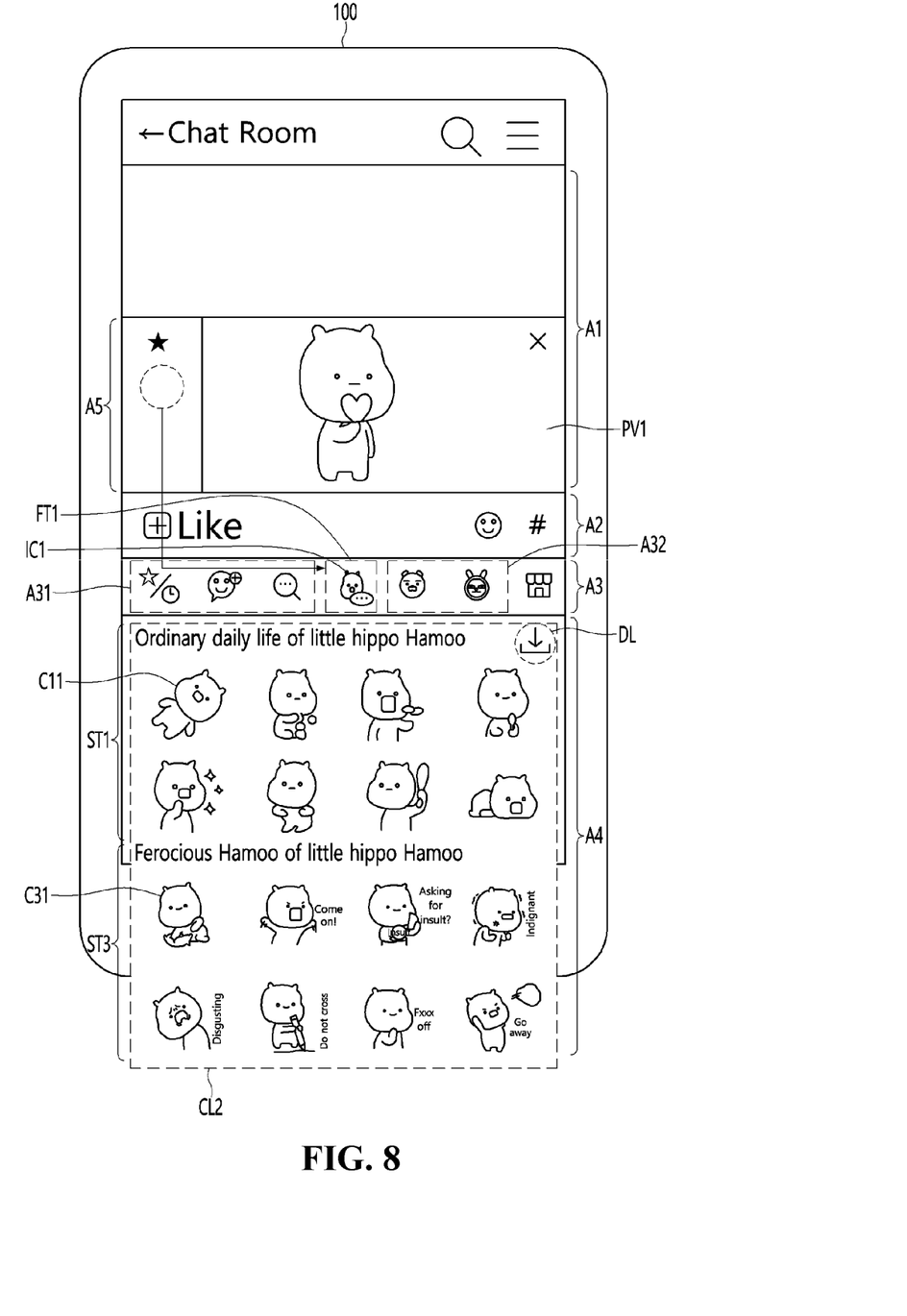

In the operation of displaying the second list S130, the user terminal 100 may display a second interface DL related to a request for downloading the second list CL2, as shown in FIGS. 6 and 8.

Accordingly, when the user terminal 100 receives the user's interaction with the second interface DL, the icon IC1 indicative of the first set ST1 may be displayed in the fixed tab region A32.

When the user terminal 100 receives the user's interaction with the second interface DL, the user terminal 100 download and store at least one of thumbnail information, preview information, and icon information on each content included in the second list. If the user terminal 100 downloads the above-described information, it may mean that the user terminal 100 downloads the corresponding information separately from information received for displaying the second list and stores the downloaded information in a storage space.

Accordingly, the icon IC1 indicative of the first set ST1 displayed in the fixed tab region A32 may be changed to a fixed icon, and thus, the icon may be maintained even if the chat room providing application is terminated and then re-executed.

In addition, as shown in FIG. 8, the icon IC1 indicative of the first set ST1 displayed in the operation S130 of displaying the second list may be displayed as an image distinct from the fixed icon A32i.

That is, in the icon IC1 indicative of the first set ST1 displayed in the partial region FT1, a mark distinct from the fixed icon A32i displayed in the fixed tab region A32 may be further displayed.

In addition, as shown in FIG. 8, contents included in the second list CL2 displayed in the first region A4 may be associated with the same character. However, the second list CL2 may further include not only the contents in the first set ST1, but also a third set ST3 associated with the same character as that of the contents in the first set ST1.

Here, the third set ST3 may be a series set of the first set ST1. The contents in the third set ST3 may have the same character as that of the contents in the first set ST1, but may have a different theme from that of the contents in the first set ST1.

For example, as shown in FIG. 7, although the character of the contents included in the first set ST1 and the third set ST3 is a hippo-related character, the theme of the first set ST1 may be the ordinary daily life of a little hippo whereas the theme of the third set ST3 may be a ferocious hippo.

That is, the contents included in the first set ST1 and the third set ST3 all have the same character, but the themes associated with the images of the character included in the respective sets may be different from each other.

Figure 9:
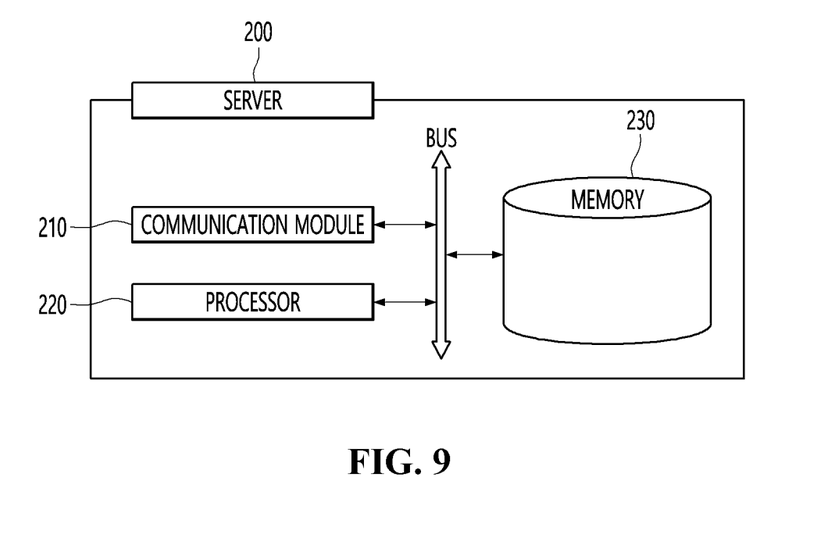
FIG. 9 is a diagram for explaining a configuration of a server according to an embodiment of the present disclosure.

FIG. 9 is a diagram for explaining a configuration of a server 200 according to an embodiment of the present disclosure.

The server 200 of the present disclosure may include a communication module 210, a processor 220, and a memory 230, and the communication module 210, the processor 220 and the memory 230 may transmit and receive information or control signals through a bus.

The memory 230 is a computer-readable recording medium and may include a random access memory (RAM), a read only memory (ROM), and a permanent mass storage device such as a disk drive.

In addition, the memory 230 may store an operating system or at least one program code (e.g., a code for an application installed and driven in a user terminal 100).

The communication module 210 may provide a function that allows the server 200 to communicate with the user terminal 100 via a network.

The processor 220 may be configured to process instructions of a computer program by performing basic arithmetical, logical, and input/output operations. An instruction may be provided to the processor 220 by the memory 230 or the communication module 210. For example, the processor 220 may be configured to execute a received instruction according to a program code stored in a recording device such as the memory 230.

The processor 220 may perform an operation for providing information on the contents included in a first list CL1 and a second list CL2 to the user terminal 100.

Figure 10:
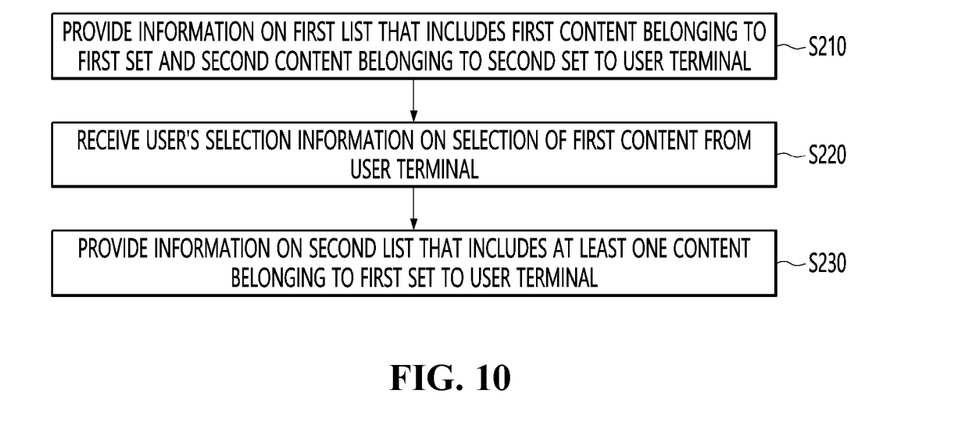
FIG. 10 is a diagram for explaining an example of a method for a server to provide contents to a user terminal according to an example of the present disclosure.

FIG. 10 is a diagram for explaining an example of a method for a server 200 to provide contents to a user terminal 100 according to an example of the present disclosure.

As shown in FIG. 10, the method for the server 200 to provide contents to the user terminal 100 according to the present disclosure may include providing information on a first list in operation S210, receiving selection information in operation S220, and providing information on a second list in operation S230.

As shown in FIG. 10, in the operation S210 of providing information on the first list, the server 200 may provide information on a first list CL1 that includes a first content C11 belonging to a first set ST1 and a second content C21 belonging to a second set to the user terminal 100.

When the server 200 receives information on a request for provision of the first list CL1 from the user terminal 100, the operation S210 of providing information on the first list may be performed by the server 200 in response to the information on the request for provision of the first list CL1.

When one of a search suggestion icon A31c and a search icon A31b is selected by a user in the user terminal 100 or when a content used by the other person in a chat room is selected by the user, the information on the request for provision of the first list CL1 may be received from the user terminal 100 according to the selected information.

Here, the information on the first list CL1 may include at least one of thumbnail information, preview information, and icon information on each content (including the first and second contents) included in the first list CL1.

For example, the server 200 may provide all of the thumbnail information, the preview information, and the icon information on each content included in the first list CL1 as information on the first list CL1 to the user terminal 100.

Here, the thumbnail information may be used for the user terminal 100 to display a content for the first list CL1 in the first region A4 of the chat window screen.

The preview information may be used when the user terminal 100 displays a first preview content in the preview region A5 of the chat window screen.

In addition, the icon information may be used for the user terminal 100 to display the icon IC1 indicative of the first set ST1 for the first interface in the preview region A5 or to display the icon IC1 indicative of the first set ST1 in the second region A3.

In the operation S220 of receiving the selection information, the server 200 may receive the user's selection information on selection of the first content C11 from the user terminal 100.

As described above with reference to FIGS. 3 to 5, when the first interface present in the preview region A5 is selected by the user in the user terminal 100, the user terminal 100 may transmit selection information on selection of the first set ST1 to which the first content C11 belongs to the server 200 and the server 200 may receive the selection information.

Then, in the operation S230 of providing information on the second list, the server 200 may provide information on a second list CL2 that includes at least one content belonging to the first set ST1 to the user terminal 100.

Here, the information on the second list CL2 may include at least one of thumbnail information and preview information on each of the contents belonging to the first set ST1.

For example, in the operation S230 of providing information on the second list, the server 200 may provide thumbnail information and preview information on the contents belonging to the first set ST1 as the information on the second list CL2 to the user terminal 100.

Accordingly, the user terminal 100 may control the contents in the second list CL2 to be displayed in the first region A4 using the thumbnail information on the contents in the first set ST1.

In addition, when a specific content is selected from among the contents in the second list CL2 by the user, the user terminal 100 may display a preview content using preview information on the specific content.

In addition, when a specific content is selected by the user, the user terminal 100 may request image information on the specific content from the server 200 and the server 200 may provide image information on the specific content in response to the request from the user terminal 100.

Accordingly, the user terminal 100 may use the image information on the specific content to display an emoticon in the chat window region A1.

However, in contrary, in the operation S230 of providing information on the second list, the server 200 may provide the user terminal 100 in advance with image information on each of the contents in the first set ST1, the contents which are to be displayed as the second list CL2.

In addition, when the server 200 receives information on the user's interaction with the second interface DL associated with downloading from the user terminal 100, the server 200 may provide download corresponding information in response to the information on the user's interaction with the second interface DL to the user terminal 100.

For example, (1) in the operation S230 of providing the information on the second list, when the server 200 provides only thumbnail information and preview information on the contents in the first set ST1, the server 200 may provide image information to be used as emoticons for the respective contents in the first set ST1 as the download corresponding information to the user terminal 100.

Alternatively, (2) in the operation S230 of providing the information on the second list, when the server 200 provides not just the thumbnail information and preview information on the contents in the first set ST1, but also image information to be used in the chat window region A1, the server 200 may provide information for changing the icon IC1 indicative of the first set ST1 to a fixed icon A32i, as the download corresponding information to the user terminal 100.

As described above, in the present disclosure, when the first list CL1 including the first content 11 of the first set ST1 and the second content C21 of the second set associated with a character different from a character of the first set ST1, the icon IC1 indicative of the first set ST1 to which a content desired by the user from the first list CL1 belongs may be displayed in the second region A3 and the content belonging to the first set ST1 may be displayed in the user terminal, thereby enabling the user to conveniently use the desired content without downloading.

The technical features disclosed in each embodiment of the present disclosure are not limited only to a corresponding embodiment. Unless mutually incompatible, the technical features disclosed in each embodiment may be combined and applied to a different embodiment.

Therefore, technical features are mainly described in a corresponding embodiment; however, unless mutually incompatible, the technical features may be combined and applied to a different embodiment.

The present disclosure is not limited to the above-described embodiments and the accompanying drawings, and various modified examples and changes may be made in view of a person skilled in the art to which the present disclosure pertains. Therefore, the scope of the present disclosure should be determined by the scope of the appended claims, and equivalents thereof.

What is claimed is:

1. A method of providing contents to a user, the method comprising:
   displaying, by a user terminal, a first list comprising a first content belonging to a first set and a second content belonging to a second set different from the first set in a first region on a chat room screen, wherein any one of the first content and the second content in the first region is selectable;

receiving, by the user terminal, a user's interaction with the first content;

displaying, by the user terminal, a preview content of the first content and a first interface for requesting contents in the first set in a preview region different from the first region in response to receiving the user's interaction with the first content;

receiving, by the user terminal, a user's interaction with the first interface; and displaying, by the user terminal, an icon indicative of the first set on the chat room screen in a second region different from the first region of the chat room screen and displaying a second list comprising at least one content belonging to the first set in the first region on the chat room screen in response to receiving the user's interaction with the first interface.

2. The method of claim 1, wherein the second region comprises a function tab region and a fixed tab region and the icon indicative of the first set is displayed between the function tab region and the fixed tab region in the second region.

3. The method of claim 1, wherein the user, by the user terminal, is in a chat room and the icon indicative of the first set is continuously displayed by the user terminal.

4. The method of claim 1, further comprising:
exiting, by the user terminal, a chat room;
releasing, by the user terminal, the chat room; and
removing, by the user terminal, the display of the icon indicative of the first set.

5. The method of claim 1, wherein the first interface has an image of a character identical to a character of the icon indicative of the first set.

6. The method of claim 1, wherein:
the second region comprises a function tab region and a fixed tab region,
a function icon for providing at least one function of content search, search suggestion, and favorites is displayed in the function tab region,
a fixed icon for providing a content set designated by the user is displayed in the fixed tab region, and
the icon indicative of the first set is positioned between the function tab region and the fixed tab region.

7. The method of claim 6, wherein the icon indicative of the first set comprises an image distinct from the fixed icon.

8. The method of claim 6, wherein the displaying of the icon indicative of the first set comprises moving the fixed icon in a direction opposite to the first set of icons and displaying the icon indicative of the first set between the function icon and the fixed icon.

9. The method of claim 6, wherein:
the user, by using the user terminal, is in a chat room;
the user, by using the user terminal, exits the chat room; and
the user, by using the user terminal, re-enters the chat room and the fixed icon is displayed on the chat room screen of the user terminal.

10. The method of claim 1, wherein the displaying, by the user terminal, of the second list further comprises:
displaying, by the user terminal, a second interface associated with a request to download the second list,
receiving, by the user terminal, a user's interaction with the second interface;
displaying the icon indicative of the first set as a fixed icon;

exiting, by the user terminal, a chat room;
re-entering, by the user terminal, the chat room; and
displaying, by the user terminal, the fixed icon in response to re-entering the chat room.

11. A non-transitory computer readable medium comprising a computer program that when executed by hardware implements the method of claim 1.

12. A user terminal for providing contents to a user, the user terminal comprising:
a memory;
a processor connected to the memory and configured to execute instructions stored in the memory;
an input unit configured to receive information under control of the processor; and
an output unit configured to output information under control of the processor,
wherein the processor is further configured to:
control the output unit to display a first list comprising a first content belonging to a first set and a second content belonging to a second set different from the first set in a first region on a chat room screen, wherein any one of the first content and the second content in the first region is selectable,
when receiving a user's interaction with the first content through the input unit, control the output unit to display a preview content of the first content and a first interface for requesting contents in the first set in a preview region different from the first region in response to receiving the user's interaction with the first content on the output unit, and
when receiving the user's interaction with the first interface through the input unit, control the output unit to display an icon indicative of the first set on the chat room screen in a second region different from the first region of the chat room screen and to display a second list comprising at least one content belonging to the first set in the first region on the chat room screen in response to receiving the user's interaction with the first interface.

13. The user terminal of claim 12, wherein the second region comprises a function tab region and a fixed tab region and the icon indicative of the first set is displayed between the function tab region and the fixed tab region in the second region.

14. The user terminal of claim 13, wherein:
a function icon for providing at least one function of content search, search suggestion, and favorites is displayed in the function tab region, and
a fixed icon for providing a content set designated by the user is displayed in the fixed tab region.

15. A method for providing contents to a user terminal and for displaying contents on a chat room screen of the user terminal, the method comprising:
providing, by a server, information on a first list comprising a first content belonging to a first set and a second content belonging to a second set different from the first set to the user terminal;
receiving, by the server, a user's selection information on selection of the first content from the user terminal;
providing, by the server, information on a second list comprising at least one content belonging to the first set to the user terminal;
displaying, by the user terminal, the first list comprising the first content belonging to the first set and the second content belonging to the second set different from the first set in a first region on a chat room screen, wherein any one of the first content and the second content in the first region is selectable;

receiving, by the user terminal, a user's interaction with the first content;

displaying, by the user terminal, a preview content of the first content and a first interface for requesting contents in the first set in a preview region different from the first region in response to receiving the user's interaction with the first content;

receiving, by the user terminal, a user's interaction with the first interface; and displaying, by the user terminal, an icon indicative of the first set on the chat room screen in a second region different from the first region of the chat room screen and displaying a second list comprising at least one content belonging to the first set in the first region on the chat room screen in response to receiving the user's interaction with the first interface.

16. The method of claim 15, wherein providing, by the server, information on the first list includes the server providing at least one of thumbnail information, preview information, and icon information on each of the first content and the second content included in the first list to the user terminal.

17. The method of claim 15, wherein providing, by the server, information on the second list includes the server providing at least one of thumbnail information and preview information on each of the at least one content belonging to the first set to the user terminal.

18. The method of claim 15, wherein the second region comprises a function tab region and a fixed tab region and the icon indicative of the first set is displayed between the function tab region and the fixed tab region in the second region.

* * * * *